DATA PROCESSING SYSTEM

Filed March 30, 1955 5 Sheets-Sheet 1

INVENTOR
EVELYN BEREZIN
BY S.C. Yuter
ATTORNEY

DATA PROCESSING SYSTEM

Filed March 30, 1955 5 Sheets-Sheet 2

INVENTOR
EVELYN BEREZIN
BY S.C. Yuter
ATTORNEY

STORAGE REGISTER 17

INVENTOR
EVELYN BEREZIN
BY S.C. Yuter
ATTORNEY

"X" REGISTER 15

INVENTOR
EVELYN BEREZIN
BY S.C. Yuter
ATTORNEY

INVENTOR
EVELYN BEREZIN
BY S.C. Yuter
ATTORNEY

United States Patent Office 2,913,176

Patented Nov. 17, 1959

2,913,176

DATA PROCESSING SYSTEM

Evelyn Berezin, New York, N.Y., assignor to Underwood Corporation, New York, N.Y., a corporation of Delaware Application March 30, 1955, Serial No. 497,875

9 Claims. (Cl. 235—157)

This invention relates to data processing systems, and more particularly to electronic apparatus for processing data at high speed.

Any data processing problem can be broken down into a sequence of simple operations. Data processors of the electronic digital computer type are capable of carrying out these operations at extremely high speeds. An electronic data processor can therefore be used to solve data processing problems of great length and complexity in a small fraction of the time required by a human being.

The problem to be solved is broken down into a sequence of simple steps. Each of these steps is specified by an "instruction" and the sequence of instructions is called a "program." This program and all necessary data are entered into and stored in the data processor's "memory." The data processor thereafter carries out the instructions automatically and at high speed.

The instructions are transferred from the memory as pulse signals which represent digits. When a data processing operation is to be performed, the instruction is drawn from the memory and fed to a control unit where digits of the instruction are used to generate the control signals necessary to perform the operation.

A typical instruction contains one or more groups of digits, called addresses, which indicate the locations in the memory of the data to be processed. The remaining digits of the instruction, called the command or operation selector, are used to initiate the generation of control signals for performing the appropriate operation.

A major portion of the time required for performing many data processing operations is consumed in locating and extracting data from the memory.

It is the general object of the invention to provide apparatus for performing a data processing operation more rapidly and more efficiently.

Briefly, in a system having a data processing unit which is sequenced through an operation initiated by a command, apparatus is provided in accordance with the invention which comprises a control unit responsive to the command for generating the control signals necessary to perform the operation designated by the command, and means for transferring all or part of the command as data to the data processing unit. The data processing unit is responsive to the control signals for processing data which includes the command or the part of the command which is transferred.

A typical data processing operation is the multiplication of two factors. The instruction for a multiplication operation usually contains one or more digits comprising the command which initiate the generation of the necessary control signals for performing the operation, and one or more groups of digits designating the location or locations of the operands to be used in the operation. More particularly, the multiplication instruction contains digits in its command portion which initiate the generation of control signals which then direct the data processor to form the product of the numbers stored in the locations designated by the address portions of the instruction. The product may then be stored in the memory.

Most data processors perform two types of multiplication. One of the multiplications is called unrounded multiplication in which the complete product of the two operands is retained. In the second type, called rounded-off multiplication, the data processor only retains a product having a predetermined number of digits with the remaining least significant digits deleted. The product is usually corrected by adding a number called a round-off number.

Heretofore, the rounding off of the product of the multiplication has been performed by a step in which a round-off number is effectively added to the product. Such a method requires the separate storage or generation of the round-off number. Consequently the programming of a desired series of operations is more complicated, or additional apparatus is required thus increasing the cost or the time spent in performing the operation.

Therefore, another object of the invention is to provide a more efficient and less expensive means for performing a multiplication operation in a high-speed electronic data processor.

It is a further object of the invention to provide improved apparatus in a high-speed data processing system for performing a multiplication with round-off.

In accordance with a specific embodiment of the invention, apparatus is provided for entering a normally non-arithmetic part of an instruction into an arithmetic unit as a numerical value under control of the same instruction. More particularly, means are provided for extracting a digit (which corresponds to the round-off number) of the command portion of the instruction and inserting this digit as a numerical value into the arithmetic unit of a digital computer to perform a round-off operation.

It should be noted that the basic concept of the invention may readily be employed in other embodiments. For example, in a compare instruction, apparatus in the data processor can be controlled to select from its memory all numbers which differ from a key number by a numeric value specified by a digit in the command portion of the instruction.

Other objects, features and advantages will appear in the following description of the embodiment of the invention for performing multiplication with round-off and in the appended drawings.

GENERAL DESCRIPTION

An instruction in the digital computer employed to describe the invention comprises eight digits of which two three-digit groups are employed as addresses to designate two words in the memory which are the operands. The two remaining digits comprise the command which controls the computer in its use of the two selected operands. For most operations, such as additions and subtractions, both digits of the command are required but general multiplication may be uniquely determined by only one digit. The second digit is not needed to select a general multiplication operation and in the present computer is inserted as a round-off number into the accumulator to round-off the product. However, it should be noted that the second digit might also be necessary to designate the multiplication operation in other applications.

A multiplication instruction will be of the form "s3X *bbb aaa*" wherein "*aaa*" and "*bbb*" are the memory locations where the multiplier and multiplicand are to be found, "s" is a blank position of no instruction significance, the "3" is the portion of the multiplication command used to initiate the overall control signals, and "X" is a digit used for rounding off the product. If the product is not to be rounded off, "X" is a zero whereas a five is used for the rounding off of the lowest denominational order of the product to be retained. A digit other than five may be used if the lowest order is to be rounded off with respect to a different value.

Figure 1:
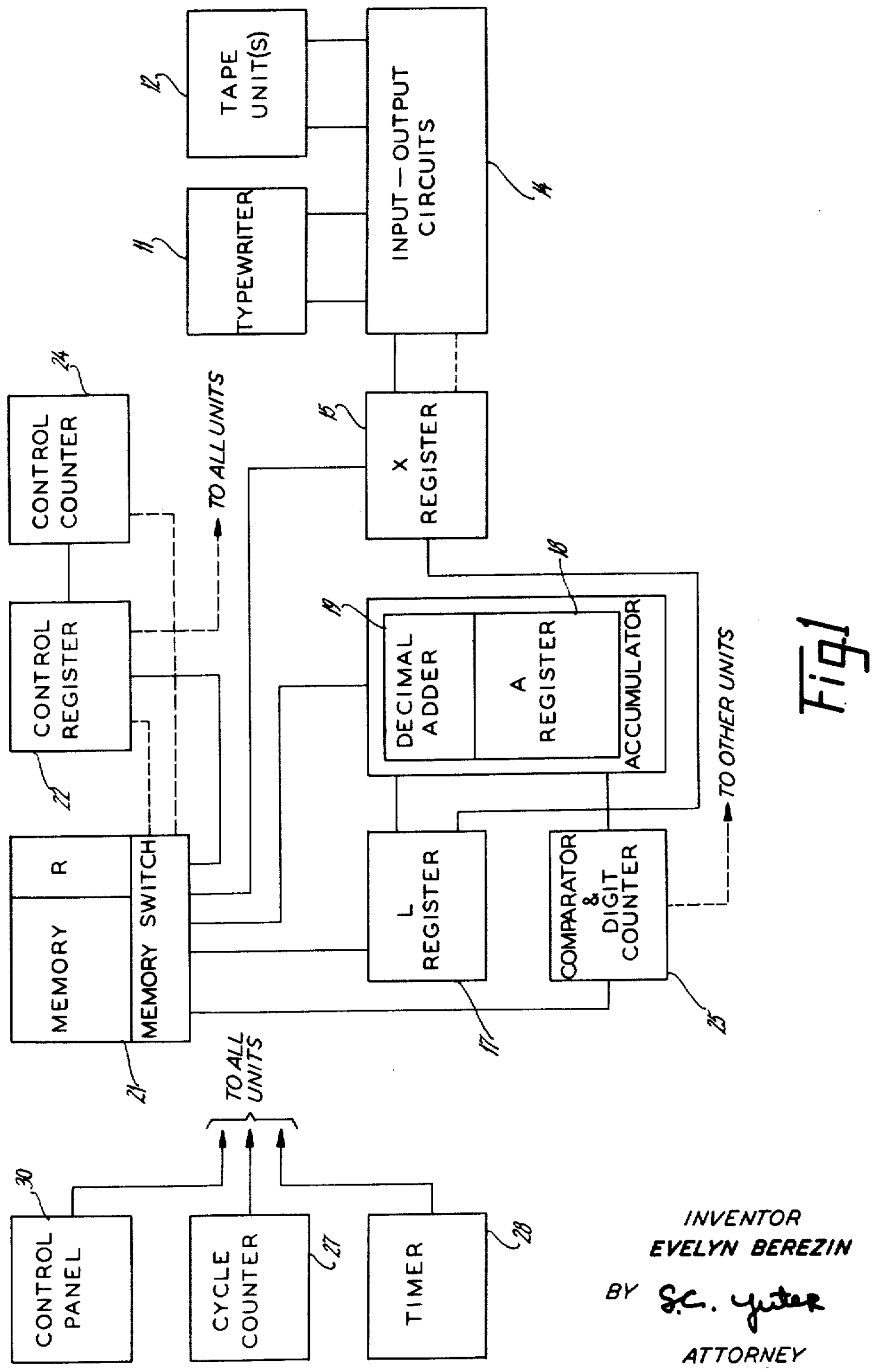
Fig. 1 is a block diagram of an electronic digital computer in which the present invention is utilized.

Referring now to the block diagram of Fig. 1, the computer is initially controlled by the keys of a typewriter 11 or by a tape unit 12 which may include either a magnetic tape or a punched tape or both on which information is recorded. These input devices 11 and 12 feed information representing signals into an input-output circuit 14 which codes the signals and transfers them in proper sequence to a shifting or "X" register 15 where the individual signals are assembled into a complete word of nine digits. The word in the "X" register 15 may also be retransmitted to the input-output circuits 14 digit by digit for rerecording on either or both of the typewriter 11 or tape units 12.

Another register 17, termed the "L" register, is substantially a storage device and can receive a word from or transmit a word to the "X" register 15. Also a word in the "L" register 17 may be sent to an accumulator 18, termed the "A" register. The "A" register 18 includes a decimal adder 19 and, as an accumulator, is capable of retaining a value therein and adding to that value another value received at an input to form the correct sum and thereafter retaining the sum.

A memory device 21 which may comprise a rotating drum coated with a magnetic material or any other suitable storage device, is provided to store words of information and is controllable to transmit these words to or receive them from the "L" register 17, the "X" register 15, the "A" register 18, or a control register 22. The control register 22 is not used for computation but receives from the memory a word of instruction and thereafter controls the transmission of words between memory 21 and registers 15, 17, and 18 to perform the instructed operation.

A control counter 24 is provided to select, at the beginning of each computing operation, a particular word stored in memory 21 for transmission to the control register 22.

The comparator and digit counter 25 can receive and compare words from the memory 21, or the registers 17 and 18 and, depending upon such comparison, can alter the program in a selected manner or by counting selected computing steps can, at the end of an operation, direct the machine to the next programmed step.

The cycle counter 27 is, in effect, a director of the steps of a computation and will normally direct one step to follow another as soon as a first step is performed although it may be held at a particular step when called for by the computation being performed. The cycle counter will be originally in what may be called a "K3" step wherein an address present in the control counter 24 is continuously compared with the then address of the memory 21. When address agreement is found, the cycle counter 27 is advanced to the next or "K1" step and during the first cycle of such step, called a "J" cycle, the word in that address on the magnetic drum of memory 21 is read into the control register 22. During the remainder of the "K1" step the "*aaa*" address, see above, of the word then present in the control register 22 is compared with the then location of the memory 21 until correspondence is found wherein the cycle counter is shifted to the next or "K2" step during the first or "J" cycle of which the word in address "*aaa*" is read out of the memory 21 for utilization as directed by the instruction part of the word then in the control register 22. For the rest of the "K2" step the "*bbb*" address in the control register is compared with the memory location until the two addresses agree which agreement causes the cycle counter 27 to shift to the "K3" step during the "J" cycle of which the word in address "*bbb*" is read from the memory 21 for use as directed by the control register 22. The cycle counter 27 is blocked from further operation until the termination of the initiated computation when it is released to repeat the cycle as set out above.

The timer 28 which may be as shown in a copending application Serial No. 471,696, filed November 29, 1954 by Auerbach et al. is used to provide signals synchronized with the speed of rotation of the magnetic drum of memory 21 for timing purposes. In particular, timer 28 supplies four sets of clock signals, the first of which, the C0 signal, has a pulse for each position of a bit of information of the words stored in memory 21, each pulse being one-half of the width of a signal interval. The C1, C2, and C3 signals are the same as the C0 signals but are delayed by one-quarter, one-half and three-quarters of a signal interval respectively. Narrow pulses N0, N1, N2, and N3 are pulses centered with the C0, C1, C2, and C3 signals pulses and are of one half the width thereof to enable more precise timing when required.

The timer 28 also includes recirculation loops initially synchronized with the first position of a bit in the addresses of the memory 21 and by taps on these loops, a signal may be derived at any time position during the thirty-six bits comprising a word. Such signals in turn may be combined to produce groups of signals having selected timings or to control generation of signals over a selected interval. These timing signals will be designated $t(x)$ or $t(x—y)$ with the $(x)$ or $(x—y)$ indicating the bit position of a word at which the signals occur or the bit positions during which a signal continues.

The control panel 30 is manually operated and may supersede the automatic machine functioning when desired for test purposes and to start machine operations.

MULTIPLICATION GENERALLY

A multiplication operation will start with cycle counter 27 of the computer at the "K3" step continuously comparing the address in the control counter 24 with that then present in memory 21. When the two addresses are the same, the cycle counter 27 steps to "K1" during the "J" cycle of which the word in the selected address is entered into the control register 22 as an instruction which for a multiplication would have the form "s3(X) *bbb aaa*" as stated above. The presence of the 3 in the positions for the eighth denominational order is immediately sensed and the multiplication controls are thereby made effective. On the next cycle of the "K1" step, the "A" accumulator 18 is cleared of any amount therein and a decimal "0" (i.e., the binary terms 0011 since the computations are performed in an "excess 3" code) is inserted into the binary positions for each denominational order except the eighth order which is left clear at a binary "0." During succeeding cycles of the "K1" step, the address "*aaa*" is searched for in the memory 21 and when it is found, the cycle counter 27 shifts to the "K2" step during the "J" cycle of which the factor in that address is entered into the "L" register 17 where it will continue to circulate. In further cycles of the "K2" step the address "*bbb*" is compared to the address of the memory 21 until agreement is found which steps the cycle counter 27 to the "K3" step during the "J" cycle of which the memory 21 is read to enter the factor in the "bbb" address into the "X" shifting register 15. The entry into the "X" register is the multiplier of a multiplication operation and as the multiplier is entered subtractively into a clear register each denomination will thereby be set to the nines complement of the corresponding multiplier digit. During the same cycle the "X" term in the seventh denominational order of the word of instruction in the control register 22 is delayed and entered into the eighth ($10^7$) denominational order of the "A" accumulator 18.

The multiplicand in the "L" register 17 is then added into the "A" register and one is added into the units ($10^0$) order of the multiplier complement in the "X" register in this and in each succeeding cycle until the lowest digit of the multiplier complement becomes a "nine" at which point the multiplicand has been added as many times as was required by the lowest multiplier digit.

Addition of the multiplicand into "A" register 18 and the "one" into the lowest ($10^0$) denomination of the "X" register 15 is then terminated and the partial product in the "A" register 18 and the multiplier complement in the "X" register 15 are shifted one denominational order to the right during the next cycle. This clears the eighth ($10^7$) denominational order of the "X" register 15 and shifts out the lowest ($10^0$) denominational order of the partial product from the "A" register 18. This shifted out value is temporarily stored for insertion into the clear ($10^7$) order of the "X" register 15 at the proper time.

Addition of the multiplicand in the "L" register 17 into "A" register 18 and "one" into the lowest ($10^0$) denominational order of the "X" register 15 will then resume until the value shifted into the units order of the "X" register (i.e., the $10^1$ term of the multiplier) has been increased to "9" to cause a second shift similar to the one above described. Such alternate shifting and adding will continue until the multipler complement has been entirely removed from the "X" register 15 at which point the digit counter has counted "eight" shifts and stops multiplication.

At this point, the "A" register 18 contains the seven or eight more significant digits of the product and the "X" register 15 contains the eight less significant digits which may be disposed of as required by the problem being solved. If the original operating instruction had been "*s*30" the final product is correct in all of the sixteen digital positions and both parts may be of value. If, however, the instruction had been "*s*35," the "5" would have been entered into the eighth ($10^7$) denominational order of the "A" register 18 and by the successive shifts to the right would have ended up in the same denominational order of the "X" register 15 so that the number in the "X" register is not correct and should be discarded.

The presence of this "5" in the various denominational orders of the "A" register 18 during the multiplication, caused a tens transfer to occur into the denomination which ended up as the lowest ($10^0$) denomination of the "A" register 18 when the next lower order of the product, the one which had the "5" originally entered therein, had an actual value of 5 or more. Therefore, the lowest denominational order digit of the final partial product in the "A" register 18 will be rounded-off to the next higher digit if the largest non-significant digit of the product was a 5 or more.

Obviously, the final partial product can be rounded-off about any other digit by using the tens complement of that digit in place of the "0" or "5" in the multiplication instruction, for example, if the instruction is *s*37, the final partial product will be rounded-off if the highest denomination of the non-significant digits of the product is 3 or more.

As an example of both normal and rounded-off multiplication, the product of 5391 times 2038 is determined as follows using only four denomination registers for simplicity instead of the eight denominations available.

*Multiplicand 5391 in "L" register*

| | Normal Multiplication | | Round-Off Multiplication | |
|---|---|---|---|---|
| | "A" Register | "X" Register | "A" Register | "X" Register |
| Initial | 0000 | 7961 | 5000 | 7961 |
| Add | 5391 | 1 | 5391 | 1 |
| Sum | 5391 | 7962 | 10391 | 7962 |
| Add | 5391 | 1 | 5391 | 1 |
| | 10782 | 7963 | 15782 | 7963 |
| | --------- | --------- | --------- | --------- |
| | --------- | --------- | --------- | --------- |
| Sum | 37737 | 7968 | 42737 | 7968 |
| Add | 5391 | 1 | 5391 | 1 |
| Sum | 43128 | 7969 | 48128 | 7969 |
| Shift | 4312 | 8796 | 4812 | 8796 |
| Add | 5391 | 1 | 5391 | 1 |
| Sum | 9703 | 8797 | 10203 | 8797 |
| Add | 5391 | 1 | 5391 | 1 |
| Sum | 15094 | 8798 | 15594 | 8798 |
| Add | 5391 | 1 | 5391 | 1 |
| Sum | 20485 | 8799 | 20985 | 8799 |
| Shift | 2048 | 5879 | 2098 | 5879 |
| Shift | 204 | 8587 | 209 | 8587 |
| Add | 5391 | 1 | 5391 | 1 |
| Sum | 5595 | 8588 | 5600 | 8588 |
| Add | 5391 | 1 | 5391 | 1 |
| Sum | 10986 | 8589 | 10991 | 8589 |
| Shift | 1098 | 6858 | 1099 | 1858 |

The full product is 10,986,858 and is retained in the "A" and "X" registers 18 and 15. When rounded-off to the number of significant figures in the multiplier and multiplicand this product becomes 1099, the value present in the "A" register 18 alone when rounded-off multiplication is performed. The "5" originally present in the "A" register 18 has been shifted into the highest denomination of the "X" register 15 during the last shift cycle which left the final product in the "A" register and, except for the possible tens carry caused by its presence, it does not appear in the rounded-off product. The value in the "X" register 15 is, of course, of no significance on this operation and should be discarded.

Most of the devices referred to in the above general description, particularly the typewriter input, the tape inputs, the input-output circuits, the control panel, the memory, the cycle counter and the digit counter are substantially similar to those of prior electronic computers, being specifically embodied in the commercial Elecom 120 electronic computer, and more fully described in the application of Samuel Lubkin, Serial No. 370,538, filed July 27, 1953 for an "Electronic Digital Computer" which application discloses an early embodiment of the Elecom 120. The following specific description will therefore be limited to such devices as are directly associated with the claimed structure.

CONTROL REGISTER

The control register 22 is generally a pulse recirculation path into which pulses may be introduced and which will re-introduce the same pulse form into the input path after a time delay of 36 pulse cycles, the length of one word of a program instruction, together with control circuits rendered effective by predetermined combinations of the circulating pulses. Each word, both instruction and value, consists of 36 pulse positions divided into 9 decimal denominations of four pulse positions each with a digit value being represented in the four pulse positions in a binary plus three code with the lowest binary bit of the lowest digit appearing first in time at any given point and the other bits appearing in increasing order at subsequent pulse times. The time that the first binary bit of a word is read from the memory 21 is taken as T1 with the later pulses being numbered up to T35 and the 36th pulse being arbitrarily termed T0.

Most of the computer control circuits are set at time T34½, that is 1½ pulse times in advance of the reception of an input signal to insure that the circuits are prepared. It may be noted here that the ninth digit of a word is never a numerical value but is solely a sign characteristic for positive or negative values being either 0010 or 0000 respectively and thus there will never be pulses in the last two positions of a word to erroneously enter into an open channel. The pulses comprising a word are at T34½ available at specific locations around the recirculation path of the control register 22 and may be made available by suitably connected taps for control purposes. For the present disclosure, only those circuits giving such pulses as are used for multiplication will be specifically set out.

Figure 2:
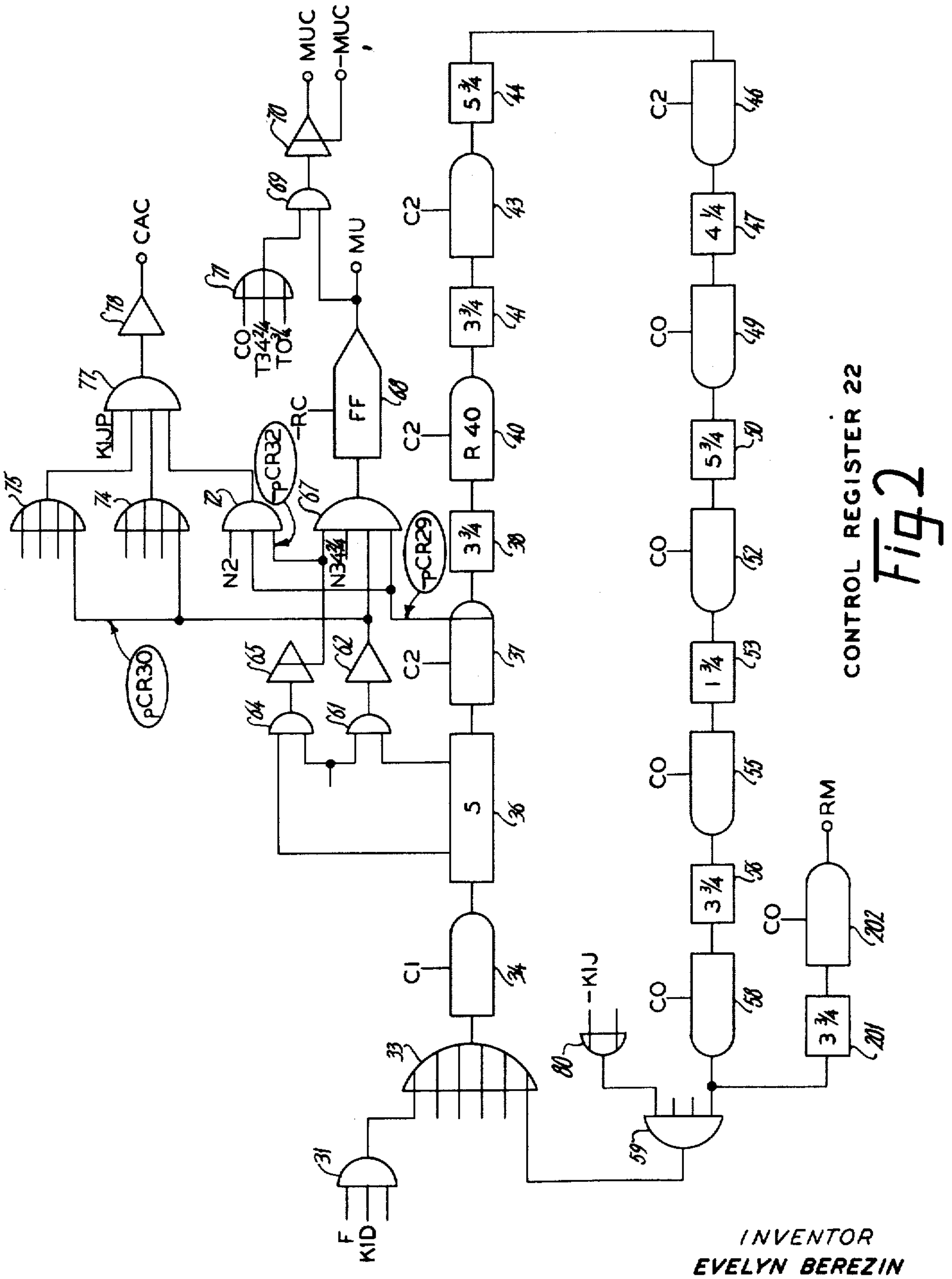
Fig. 2 is a schematic diagram of a control register of such a computer.

The control register 22 is more particularly shown in Figure 2 and is fed the pulses comprising a word of instruction from memory 21 through an input line F forming one input to a gate 31. All such gates must have a positive voltage applied to all input leads before a positive voltage will appear at the output and are commonly termed "And" gates. During the "K1" step, that is, memory readout to the control register, the input K1D will be positive and gate 31 will pass the F pulses into the control register. The control register 22, consists of a buffer 33 of the type which will pass a pulse applied at any input lead, and are therefore also known as "Or" gates, one of the leads being the output of gate 31, a reshaper 34, a delay line 36, and a further chain of alternate reshapers 37, 40, 43, 46, 49, 52, 55 and 58 and delay lines 38, 41, 44, 47, 50, 53, and 56 in a series circuit. The output of reshaper 58 is fed through a gate 59 back to buffer 33 to complete the recirculation path. Reshapers and delay lines are well known in the art and a further description of these items is believed unnecessary. Generally the function of a reshaper is to retime and reshape a pulse applied at one of its inputs into correspondence with a clock pulse applied at a second input and may also provide a negative output which will be positive at all times except when a pulse is reshaped. A reshaper will introduce a ¼ period delay between the input and output pulses and the particular one of the clock pulses used for reshaping is indicated at the reshaper input terminal although it is of no particular importance herein. A delay line is essentially a lumped impedance and is well known in the art, its function being to delay the appearance of an output pulse for the number of pulse times indicated on the symbol for each delay line. The total time delay between application of a pulse to buffer 33 and its reappearance at buffer 33 from gate 59 is 36 pulse times so that any recirculating pulse of a word will appear at the same time in each cycle.

In multiplication, the instruction word will have a "3" in the eighth position which "3" will, in the excess three binary code, be represented as 0110, that is with a pulse in positions 30 and 31 and no pulses in positions 29 and 32. At the T34½ time, pulse 29 will be present at the output of reshaper 37 and as there should be no pulse at this time, the negative output of reshaper 37, that is, an output which is at a positive voltage except when a pulse is reshaped, should be used. The 30 pulse is obtained from a tap on delay line 36 and passes through a gate 61 and an amplifier 62. The 32 pulse is taken from an earlier tap on delay line 36 and passes through a gate 64 and an amplifier 65. The negative lead of amplifier 65 which is at a positive voltage except when a pulse is amplified is used as there should be no pulse at this time. These three signals, pulse 30 and the negative of pulses 29 and 32 are applied, together with a narrow pulse N34½ centered in the T34½ pulse, to gate 67. As all inputs to gate 67 are positive at this time, assuming that multiplication is to be performed, a positive voltage will pass gate 67 to set a flip-flop 68. Such flip-flops are well known in the art and operate in response to a short input signal to change their state and thereafter give a continuous output signal until reset by a signal on a reset line. The output signal MU of flip-flop 68 is applied as one input of a gate 69 which also receives C0, T34½ and T0¾ signals from a buffer 71. C0 is a continuous clock pulse having its leading edge going positive at the start or zero point of each T pulse. Other C pulses C1, C2, and C3 having their positive leading edges delayed by ¼, ¾, and ¾ of a pulse time may be found in the computer. The gate 69 will then pass the C0, T34½, and T0¾ signals to an amplifier 70 which generates the pulsing MUC and —MUC signals for use during multiplication.

Another pulse is generated under control of the same three signals, i.e., pulse 30 and the negative of pulses 29 and 32. The negative of pulses 29 and 32 at reshaper 37 and amplifier 65 respectively together with a narrow pulse N2 are applied as inputs to a gate 72. The pulse 30 is applied to two buffers 74 and 75 whose outputs are combined with the output of gate 72 and a K1JP pulse at a gate 77 the output of which is amplified by an amplifier 78 to give a clear accumulator signal pulse, CAC, at time T34½. The K1JP pulse is generated in the timer 28 during the first or "J" cycle of a "K1" step, that is, read from memory 21 into control register 22, at time T34½.

Any word already present in the control register 22 during entry of a new word is prevented from re-entering the recirculation path by a negative signal —K1J applied through a buffer 80 to gate 59 during such reading in, i.e., the K1J cycle.

STORAGE REGISTER

The "L" or storage register 17 is used to store the multiplicand during multiplication and is a 36 pulse recirculation path somewhat similar to the control register 22 but simplified in that there is no need for setting controls from this register 17. The recirculation path of the storage register 17, Figure 3, comprises the reshapers 81, 84, 87, 90, 93, 96, and 99 and the delay lines 83, 86, 89, 92, 95, and 98 alternating in a series circuit with reshaper 81 receiving the input signals and reshaper 99 supplying the output signals after a total time delay of 36 pulse times with, as noted above, each reshaper providing a delay of ¼ pulse time and the delay lines delaying a signal by the number of pulse times indicated in the rectangular symbol for the delay line. The output of reshaper 99 is fed back to reshaper 81 through gates 100 and 102 and a buffer 103.

The reshaper 81 also receives as an input the output of a buffer 104 through which a word from the memory 21 may be fed into the storage register. During the readout from the memory 21 to the "L" register 17, which occurs during the above noted "K2" step, the F or readout signal from memory 21 is passed through a gate 106 by narrow clock signals N0 and thence through the buffer 104 to enter the recirculation loop at reshaper 81. During this period, the previous contents of the storage register 17 are blocked at gate 100 by a signal —K2MC which supplies negative pulses during only the first cycle of a "K2" step.

In a multiplication operation, the value in the "L" register 17 will include in the highest denominational order, the algebraic sign of the multiplicand, either 0010 or 0000. As accumulation of the partial products requires temporary use of the ninth denominational order in the "A" register 18 to store carry over values, the ninth denomination of the "L" register 17 is later set to 0011, i.e., decimal "0", so that there will be no alteration in this position when the multiplicand is added.

The pulses representing decimal "0" are entered into the recirculation path during the entry of the multiplier into the "X" register 15 at which time the multiplicand sign is used to determine the sign of the final product. During such multiplier entry, the K3J cycle, a gate 105 feeding buffer 103 is opened by a K3JC signal and the MUC signal from the control register 22, Fig. 2, to pass a T33 and a T34 pulse into buffer 103 to set the highest order of the multiplicand to 0011.

STEPPING REGISTER

The stepping or "X" register is another recirculating register having a normal channel of 36 pulse times delay but including alternative paths, one of which is of only 32 pulse times length so that pulses at the output appear four pulse times earlier than their normal time and the circulating value is, in effect, reduced by a factor of ten, and another path which passes through an adding device to increase the register value by one unit each cycle.

Figure 4:
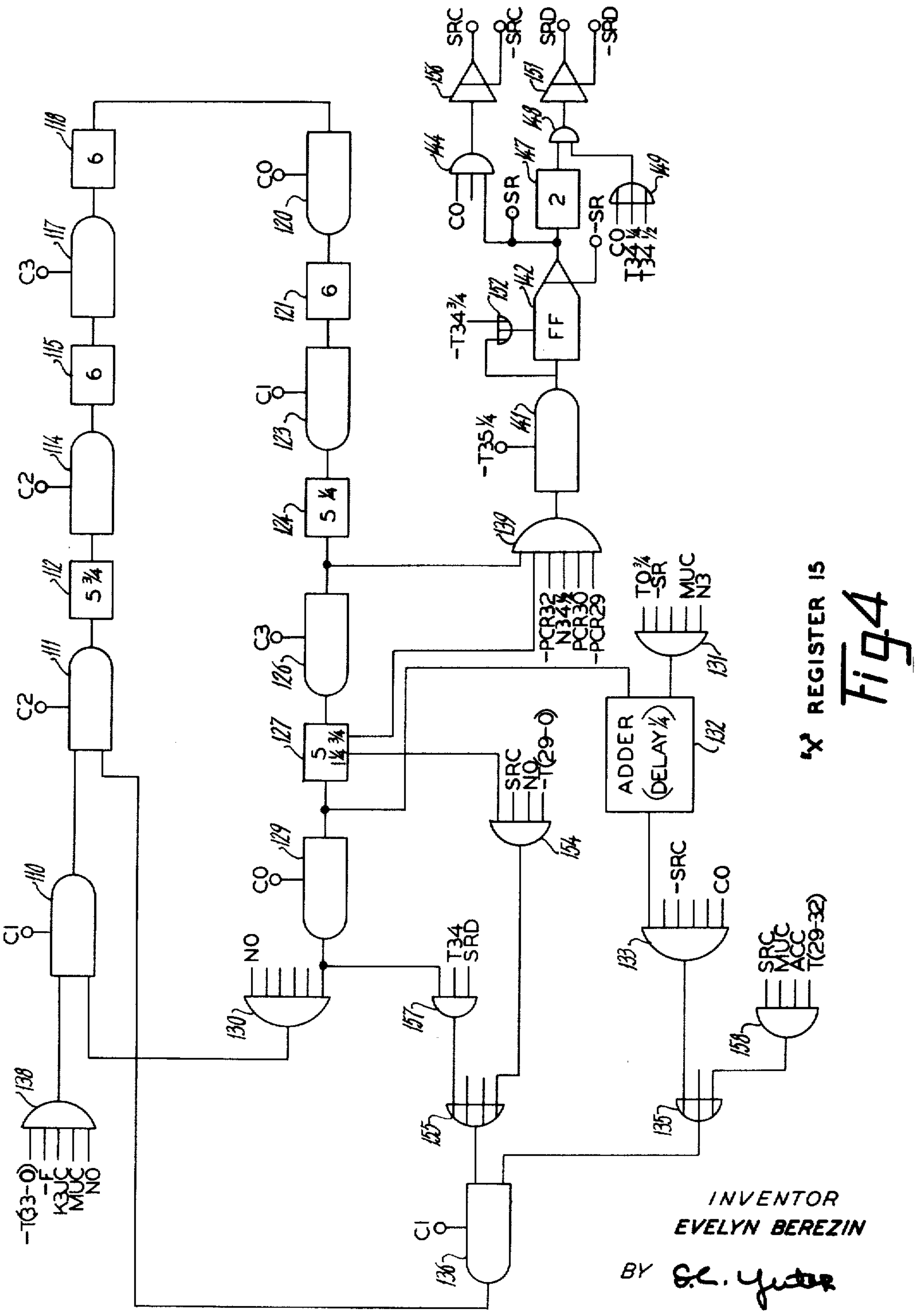
Fig. 4 is a schematic diagram of the multiplier or stepping register and its control circuits.

The normal recirculation path of the stepping register 15, Figure 4, starts at a reshaper 110 from which signals are sent to alternating reshapers 111, 114, 117, 120, 123, 126, and 129 and delay lines 112, 115, 118, 121, 124, and 127, with the output of reshaper 129 passing through a gate 130 back to the input of reshaper 110 to complete the recirculation path. An alternative path is used instead of the above noted normal path during multiplication to add a unit to the multiplier value during each cycle. This alternate path is from the output of delay line 127 to an adder 132 where the multiplier value is combined with a pulse from a gate 131 at T0¾. Such adders are well known in the art and need merely add binary values for as the units order the multiplier never exceeds a decimal 9, no tens transfer mechanism between denominations is required. The output of adder 132 after a total delay of ¼ pulse time passes through a gate 133 and a buffer 135 to a reshaper 136 from which it passes to the input of reshaper 111 in the proper timing.

The input signal representing the multiplier is inserted into the stepping register at reshaper 110 through a gate 138. It will be noted that the input to this gate 138 is the —F signal which in the excess three binary code represents, in each decimal order, the nines complement of the actual multiplier digit and hence the value put into stepping register 15 is the nines complement of the actual multiplier value. Gate 138 also receives a —T(33–0) signal which prevents insertion of the complement of the sign of multiplier in pulse positions 33 to 36, which would have no signifiance and is actually used in another manner of no importance to this disclosure. The other signals to gate 138 are the K3JC signal which is present during only the memory readout to the "X" register 15, the MUC signal from the control register 22, Figure 2, present only during multiplication and the N0 timing signals which signals in combination prevent entry of the memory readout during any other cycles.

Upon each recirculation of the multiplier value, the value in the "L" register 17 is entered into the "A" register 18 in a manner to be later described and "one" is added to the multiplier value. As the multiplier is in complemental form, the addition of a "one" is equivalent to subtracting "one" from the actual value. When the units order of the multiplier is increased to "9," coded 1100, it indicates an actual units value of "0" and no more multiplications are to be made in that order. Instead, the partial product in the "A" register 18 and the multiplier complement are shifted one denomination per cycle to the right until the then lowest denominational value in the "X" register 15 is not a "9" at which point the additions into the "A" register 18 are resumed.

At the normal control time T34½, the *p*4 pulse will be present at the output of delay line 124 and the *p*3 pulse will be present at a tap at a ¾ delay on delay line 127. These pulses together with a timing pulse N34½ and —*p*CR29, *p*CR30 and —*p*CR32 pulses from the control register 22, Figure 2, the same pulses as are applied to gate 67, Figure 2, are applied to a gate 139 and when all pulses are simultaneously present, i.e., during multiplication with a "9" present in the lowest order of the multiplier, a pulse is transmitted to reshaper 141. The reshaper 141 which is essentially a flip flop device operable only during the positive portion of a control input, usually a clock pulse, as more fully set out in the above application Serial No. 370,538, will transmit a pulse until it is cut off by a negative signal at T35¼ which transmitted pulse will set a flip-flop 142, the outputs of which are shift right signals SR and —SR. The SR signal is combined in a gate 144 with clock pulses C0 and the gate output is amplified in an amplifier 156 to give the shift right clock signals SRC and —SRC. The SR signal also passes through a delay line 147 of two pulse times delay to a gate 148 which is then opened to pass C0, T34¼ and T34½ signals from a buffer 149 to an amplifier 151 whose output is the delayed shift right signals SRD and —SRD. Flip-flop 142 will be reset by a negative signal —T34¾ applied through a buffer 152 at the first cycle in which reshaper 141 does not pulse buffer 152, that is, the next cycle on which the lowest multiplier denomination is not a "9."

The SR signal opens a gate 154 which also receives as an input the pulses present at a 1¼ delay point on delay 127, timing pulses N0 and a signal —T(29–0) which is positive during the first 28 pulse periods. The output of this gate 154 passes through a buffer 155 to reshaper 136, the total path length being 32 pulse lengths and the *p*5—*p*32 signals being re-introduced as the *p*1—*p*28 pulses, effectively reducing the multiplier by a factor of 10.

The —SR signal applied to gate 131 prevents passage of the unit value pulse T0¾ through the gate 131 into the adder 132 while the —SRC signal applied to gate 133 blocks the output of adder 132 during such shift right cycles.

Since the sign of the final product is introduced into the "X" register 15 by devices not disclosed herein and circulates as a pulse or no pulse at the 34th time position and should not be removed from this position, a special circuit is provided to by-pass the sign position around the shifting circuit through gate 154 which will be blocked at time T34 by the negative signal —T(29–0) at gate 154. This special circuit utilizes a gate 157 between the output of reshaper 129 and buffer 155 which gate will be opened by the SRD signal and a T34 pulse to pass only the sign signal into buffer 155 at its proper timing.

After a shift right cycle, the pulse positions T29 to T32 are clear and the lowest significant digit then present in the "A" register 18 is shifted into these places for storage. This digit value is entered into the "X" register 15 through a gate 158 which is opened by the SRC, and MUC (Figure 2) signals and a T(29–32) timing signal to pass the ACC signals representing the lowest significant digit of the "A" register 18 into the *p*29—*p*32 places of the "X" register 15. The output of gate 158 passes through buffer 135 to reshaper 136 and so into the recirculation path of the "X" register.

ACCUMULATOR

Figure 5:
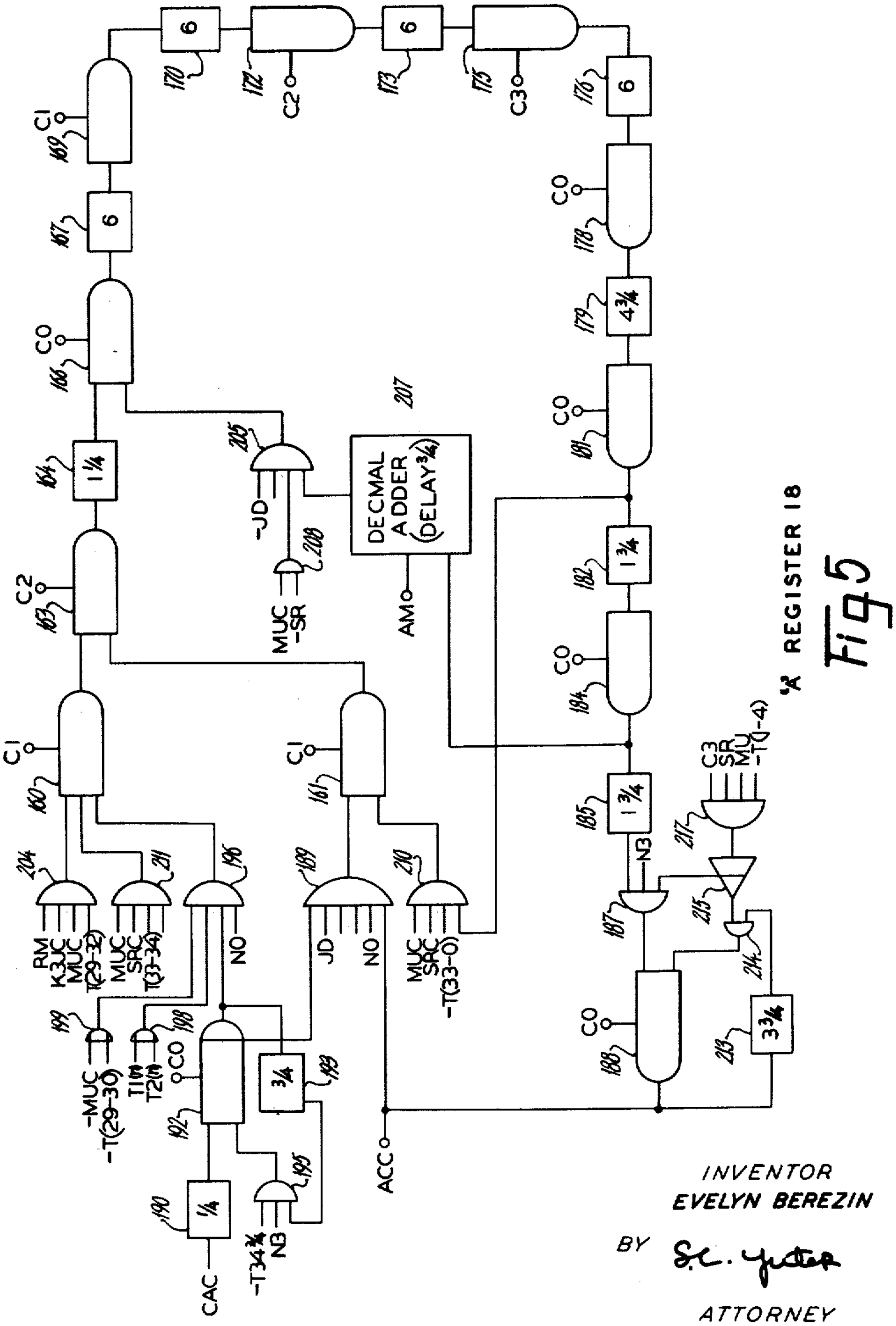
Fig. 5 is a schematic showing of the adding register which accumulates a multiplication product.

The "A" register 18, or accumulator, is also a normal recirculation path having an over-all recirculation time delay of 36 pulse times and includes a short path of 32 pulse time length to enable a right shift of a value therein as well as a decimal adder device to combine additively an input value with that already in the accumulator. The normal recirculation path of the "A" register 18, shown in Figure 5, starts at a pair of reshapers 160 and 161 in parallel which feed into the delay path comprised of the alternate reshapers 163, 166, 169, 172, 175, 178, 181 and 184 and delay lines 164, 167, 170, 173, 176, 179, 182, and 185. The delay line 185 feeds through a normally open gate 187 to a reshaper 188, a gate 189 and thence back to the input reshaper 161.

When a multiplication instruction is received by the control register 22 a CAC, clear accumulator, pulse is generated at T34½ as described above. This pulse is passed through a delay line 190 where it is delayed ¼ pulse time and then passes to a reshaper 192. The reshaper output passes through a ¾ pulse delay line 193 and a gate 195 back to the input of reshaper 192 to regenerate a new pulse after a one pulse time delay. Such new pulses will be regenerated until a negative pulse is received by gate 195 at T34¾ which will open the feed back loop and stop pulse generation. The negative pulses from reshaper 192 are applied as an input signal to gate 189 to prevent recirculation of any value then present in the "A" register 18.

The "A" register 18 will at the same time be initially set to decimal "0", i.e., 0011, in each decimal order. A gate 196 receives the positive pulses from the output of reshaper 192 as one input and also receives at another input T1(*n*) and T2(*n*) signals from a buffer 198. These T1(*n*) and T2(*n*) occur at the first and second pulse positions respectively of each four bit digit representation and will permit entry into reshaper 160 of only the first two of each group of four pulses from reshaper 192, thus setting each decimal order to 0011 or decimal "0". The eighth decimal order is, however, to remain set to binary "0," i.e., 0000 and for this purpose, the gate 196 is closed on the T29 and T30 pulses by a negative signal input from buffer 199. The —MUC input to buffer 199 is negative during multiplications, see Figure 2, but the —T(29, 30) signal goes negative only on the T29 and T30 pulses to block passage of such pulses from reshaper 192 to input reshaper 160.

During the reading of the multiplier into the "X" register 15, that is, the K3J step, the value present in the 7th decimal order of the control register is inserted into this clear eighth order of the "A" register 18. Referring to the control register, Figure 2, the output signal of reshaper 58 is sent to a delay line 201 and to a reshaper 202 with a combined delay of four pulse times so that the signal output RM lags the normal timing by four pulses, in particular, the RM pulses 25 to 28 appear at T29 to T32. It will be remembered that the seventh decimal digit of the program instruction may be either a "0" or a "5" for no round-off or round-off respectively. This digit is now entered into the "A" register, Figure 5, at reshaper 160 through a gate 204 which also receives K3JC signals to limit input to only the K3J step (entry of multiplier into the "X" register 15), MUC signals, Figure 2, to limit entry to multiplication cycles and T(29–32) pulses to select only the *p*(25—28) pulses from the RM signal. The "A" register 18 is now charged with all decimal "0's" except for a "5" in the eighth decimal position when round-off is directed.

The CAC signal is generated only once for each multiplication and the reshaper 192 generates output pulses for only one cycle after being started by the CAC pulse so that there will be no further inputs to gate 196 from reshaper 192. Likewise the K3JC signal to gate 204 is only one cycle in length so there will be no further inputs through the gate 204 to the "A" register 18 after the above described initial charging.

The normal path of the "A" register 18 will be blocked after the initial charging by disappearance of the JD signal at gate 189. This JD signal appears on only the first cycle of each K step and in this case will open the normal recirculation path. At the same time, the —JD signal applied to a gate 205 will open another path from reshaper 184 through a decimal adder 207, to gate 205, and to reshaper 166. The decimal adder is substantially similar to those known in the art and will, after a time delay of 3¾ pulse times, give an output representing the sum of the values applied to its two input circuits. In the present case, one adder input is taken from reshaper 184 which is two pulse times before the end of the normal path and the adder output is an input to reshaper 166 at 1¾ pulse times from the start of the normal path of "A" register 18 so that the output is in the proper time relation.

Figure 3:
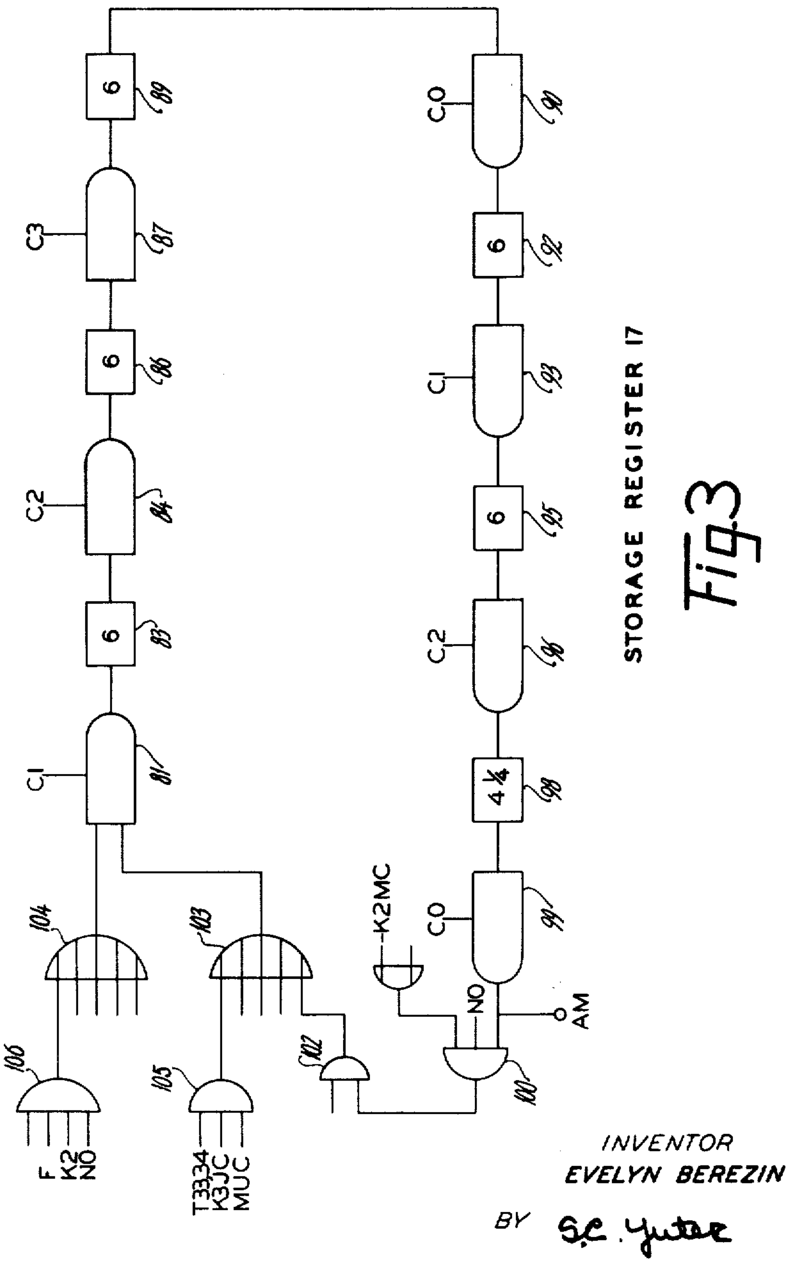
Fig. 3 is a schematic diagram of a storage register into which a multiplicand may be entered.

After the multiplier is complementally introduced into the "X" register 15, it is recirculated and increased by one on each recirculation as above described. On each cycle of such recirculation, the AM output of "L" register 17, Figure 3, is introduced as an input to the decimal adder 207 along with the signal from reshaper 184 for the re-introduction at reshaper 166 of a new signal representing the sum of the two input signals to adder 207.

Such addition continues until the multiplier in the "X" register 15 becomes a "9" in the lowest order at which time the shift right signals, SR etc., are generated at time T34½. The shift right signals stop circulation through gate 205 by application of the —SR signal to a gate 208 which also receives MUC signals on multiplication to block the MUC signals at gate 208 and thus retain gate 205 closed. At the same time, a shorter recirculation path of 32 pulse times length is opened from the output of reshaper 181 through a gate 210 to the input reshaper 161. Gate 210 receives the MUC signal from the control register 22, Figure 2, and the SRC signal from the "X" register 15, Figure 4 but is blocked until time T1 by an input pulse —T(33–0) which is negative during the 33 to 0 pulse times. Hence the first pulse will pass the gate 210 at time T1 at which time the *p*5 pulse will be present at the output of reshaper 181 since reshaper 181 is four pulse time lengths from the end of the recirculation path of the register 18. The *p*5—*p*36 pulses will be re-introduced as the *p*1—*p*32 pulses giving a right shift of four spaces and in effect reducing the value in register 18 by a factor of 10.

Under these conditions, no pulses are introduced for the *p*33 to *p*36 positions and a special gate 211 is used to insert *p*33 and *p*34 pulses into these positions to set the highest order to a decimal "0." This gate receives the MUC and SRC signals and is opened to permit passage of the MUC signals to reshaper 160 by a signal at times T33 and T34.

During such shift right cycles, the lowest digit of the value previously in the "A" register is not recirculated but is trapped in a small recirculation loop of four pulse time length for later transfer into the eighth decimal position of the "X" register 15. Connected to the output of reshaper 188 is a delay line 213 of 3¾ pulse time length which feeds a gate 214 having its output as an input of reshaper 188. Gate 214 is normally blocked by the amplifier 215 controlled by a gate 217. Gate 217 receives the clock signal C3, the MU signal on multiplication from control register 22, Figure 2, the SR signal on shift right cycles from the "X" register 15, Figure 4, and a timing signal —T(1–4) which goes negative for the first four pulse positions of a word. When the SR signal is received at about time T34½ the amplifier 215 operates to open gate 214 to set up the short recirculation path and blocks entry of signals to reshaper 188 through the application of the negative output of amplifier 215 to gate 187. During the time T1 to T4, the amplifier 215 is cut off by the signal —T(1–4) at gate 217 and the *p*1 to *p*4 pulses of the "A" register value can enter the short loop through gate 187. At time T5 the —T(1–4) signal becomes positive to re-establish the short loop through delay line 213, gate 214 and reshaper 188 and retain the *p*1 to *p*4 pulses recirculating therein until the end of the SR cycle. The ACC signal at the output of reshaper 188 is entered into the *p*29 to *p*32 positions of the "X" register as described under the heading "Stepping Register."

The additions of the multiplicand and shift cycles continue until there have been eight shift right cycles at which time the original multiplier has been entirely removed from the "X" register 15 which now contains the eight less significant digits of the computed product with the eight more significant digits of the product in the "A" register 18. The denomination in which the "5" was originally entered as a round-off digit is now in the eighth order of the "X" register and such round-off digit has no effect on the "A" register result except for the possible tens carry due to its presence, thus effectively rounding off the eighth highest digit of the final product.

The value in the "A" register may be sent to the memory 21 for retention and the remaining value in the "X" register 15 may be similarly retained if desired or eliminated in the case of a round-off remainder.

It will thus be seen that in the above described system a portion of an instruction enters into the computation directed by the instruction and that no additional programming is needed to accomplish multiplication round-off, with a resultant saving in operating time, memory space and programming complications.

The above description of a preferred embodiment of my invention is illustrative only and should not be interpreted in a limiting sense as substantial variations are possible both in structure and operations in which such functions are used without departing from the scope of the invention as set forth in the following claims.

What is claimed is:

1. In a computer having a control register in which an operating instruction may be stored, a memory device for retaining a plurality of factors, and a plurality of registers, each register retaining a factor to be operated upon, the combination of means controlled by said control register when an instruction is stored therein to enable a selection of factors from said memory device and selective entry of said factors into said registers, a device rendered operative by said control register when a predetermined instruction is contained therein to clear one of said registers of an extraneous factor therein and a second device simultaneously rendered operative by said control register to thereafter insert a portion of the instruction contained therein into said cleared register as a factor of an ensuing operation.

2. In a computer of the class described having a control register in which a word of operating instruction may be entered and retained, at least three other registers for receiving factors to be manipulated during an operation controlled by said control register in acordance with the word retained therein, factor transferring means between said registers, and means being selectively rendered effective by said control register, a device effective to remove a previous factor from one of said registers and to enter a selected value into a predetermined portion of one of said registers, a second device effective to transfer into the remaining portion of said one register, a portion of the word in said control register and means controlled by said control register when another portion thereof contains an instruction of one type to render both said devices effective whereby said portion of the word of operating instruction may be used as a factor to be manipulated.

3. In a computer of the class described having a memory to store a plurality of factors of an operation, a control register in which a word of operating instruction may be retained, at least three other registers for receiving factors of an operation selected by said control register in accordance with the word therein, factor transfer means between said memory and said other registers, a first portion of the word of instructing enabling said control register to select a factor from said memory for transfer to one of said other registers, a second portion of said word enabling said control register to select a second factor from said memory for transfer to a second of said other registers, and a third portion of said word causing said control register to determine the operations to be performed in said other registers, a device rendered effective by said control register when a part of said third portion of the word requires one type of operation to be performed, to delete a previous factor from a third of said other registers and to enter zeros into a majority of the denominations of said register, and a second device simultaneously rendered effective by said control register to enable transfer of a second part of said third portion of said word into the remaining denominations of said third register.

4. An electronic computer of the class described comprising a control register for retaining an operating instruction and two factor locating indicia, a memory device for storing a plurality of factors, means controlled by said control register in dependence upon said two indicia retained therein to sequentially select two factors from said memory device, storage devices into which said selected factors may be entered under control of said control register as determined by at least a part of said operating instruction, an accumulating register into which said factors may be transferred, means operated by said control register when a part of said operating instruction is of a predetermined value to clear said accumulating register of a factor therein and a second means similarly operated by said control register to thereafter transfer a second part of said operating instruction to said accumulating register as a third factor.

5. An electronic computer of the type described comprising a control register for retaining a train of impulses representing a control instruction, an accumulating register to receive impulses representing factors of a computation to be performed, means operated by a part of said impulses in said control register when a multiplication operation is to be performed in said computer to remove any impulses stored in said accumulating register and to enter impulses representing a zero factor therein and another means energized by said part of said impulses to cause entry of another part of said impulses into said accumulating register as a factor of the multiplication operation.

6. An electronic computer of the type described comprising a control register for retaining a train of impulses representing a control instruction and two factor locating indicia, a memory device for storing a plurality of factor representations, at least two factor retaining registers, means controlled by said impulses representing said two factor locating indicia to sequentially select two factor representations in said memory device and control transfer of said selected factor representations into said two factor retaining registers, an accumulating register into which factor representations may be transferred from one of said factor retaining registers, means controlled by a part of the impulses representing said control instruction to enable such transfer of factor representations, and a second means controlled by said part of the instruction representing impulses to cause entry into said accumulating register of another part of said instruction impulses as a factor of an operation.

7. An electronic computer of the type described comprising a control register for circulating a train of pulses representing an operating instruction, an accumulating register for receiving and circulating a train of pulses representing a factor of a computation, means set by a group of pulses of said operating instruction pulses to enable a multiplication of factors in said computer, a second means energized by said group of pulses to cause an initial clearance of said accumulating register, and an entry device for said accumulating register, said entry device being energized by said means set by a group of pulses to enter, prior to multiplication, another group of the pulses circulating in said control register into the highest denomination position of said accumulating register as a multiplication round-off factor.

8. An electronic computer of the type described comprising a control register for circulating a train of pulses representing an operating instruction and two factor locating indicia, a memory device for storing factor representations, a pair of factor registers, each factor register receiving and circulating a train of impulses representing a factor of a computation, an accumulating register to perform arithmetical addition of a factor representation therein and an entry factor representation, means controlled by said pulses representing one factor locating indicia to select a multiplicand representation from said memory device for entry as a train of pulses into one of said factor registers, means controlled by the second of said factor locating impulses to select a multiplier representation from said memory device for entry into a second of said factor registers, means set by a portion of said pulses representing a control instruction to thereafter cause repeated entry of said multiplicand representation into said accumulating register under control of said multiplier representing pulses, means triggered by said portion of said control instruction pulses to cause an initial setting of said accumulating register to a non-significant factor and a device energized by said means set by said portion of said pulses and operative while said multiplier representation is entered into said second factor register, to enter another portion of said pulses into said accumulating register as a multiplication round-off digit.

9. In a computer having a control register in which an operating instruction may be stored, a memory device for retaining a plurality of factors, and a plurality of registers, each register retaining a factor to be operated upon, the combination of means controlled by said control register when an instruction is stored therein to enable a selection of factors from said memory device and selective entry of said factors into said registers, a device rendered operative by said control register when a predetermined instruction is contained therein to clear one of said registers of an extraneous factor therein and a second device simultaneously rendered operative by said control register to thereafter insert a portion of the instruction contained therein into said cleared register as a factor of an ensuing operation.

References Cited in the file of this patent

"A Functional Description of the Edvac," University of Pennsylvania, November 1, 1949, Research Report 50–9, pages 1–4, 1–5, 1–8, 1–9, 8, 3–18 to 3–23, 4–18 to 4–24; Figs. 104—3LD—2, 104—10LD—6, 104—6LC—1.